(12) United States Patent
Waddell et al.

(10) Patent No.: US 8,134,268 B2
(45) Date of Patent: Mar. 13, 2012

(54) WOUND FIELD ELECTRICAL MACHINE FLAT BRAIDED WIRE MAIN ROTOR CROSSOVER ASSEMBLY

(75) Inventors: Simon Waddell, Oro Valley, AZ (US); David Kane, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 476 days.

(21) Appl. No.: 12/351,194

(22) Filed: Jan. 9, 2009

(65) Prior Publication Data

US 2010/0176683 A1 Jul. 15, 2010

(51) Int. Cl.
*H02K 3/51* (2006.01)
(52) U.S. Cl. .................. 310/179; 310/270; 310/198
(58) Field of Classification Search .......... 310/52, 310/179, 180, 184, 198, 270
See application file for complete search history.

(56) References Cited

U.S. PATENT DOCUMENTS

| | | | | |
|---|---|---|---|---|
| 4,385,246 A | * | 5/1983 | Schur et al. | 310/10 |
| 5,914,546 A | * | 6/1999 | Terakado et al. | 310/71 |
| 6,137,202 A | * | 10/2000 | Holmes et al. | 310/180 |
| 6,798,105 B1 | | 9/2004 | Nilson | |
| 7,015,616 B2 | * | 3/2006 | Doherty et al. | 310/194 |
| 7,157,826 B2 | * | 1/2007 | Rajasingham | 310/208 |
| 7,159,817 B2 | * | 1/2007 | VanderMey et al. | 244/12.1 |
| 2002/0096959 A1 | | 7/2002 | Quin et al. | |
| 2005/0285469 A1 | * | 12/2005 | Shore et al. | 310/179 |
| 2006/0261691 A1 | * | 11/2006 | Minke et al. | 310/71 |
| 2007/0090701 A1 | * | 4/2007 | Down et al. | 310/51 |

FOREIGN PATENT DOCUMENTS

WO    WO 2006/027023    3/2006

* cited by examiner

*Primary Examiner* — Quyen Leung
*Assistant Examiner* — Naishadh Desai
(74) *Attorney, Agent, or Firm* — Michael A. Shimokaji, Esq.

(57) ABSTRACT

A high speed aircraft generator may utilize a prefabricated crossover subassembly to interconnect field coils. The crossover may include two attachment leads interconnected with a section of braided wire. The braided wire may remain free of brazing filler metal after the crossover subassembly is brazed into position between field coils of the generator. Consequently, the crossover may remain flexible and may have reduced susceptibility to fatigue failure that may otherwise result from circumferential relative displacement of the field coils from one another during changes of rotational speed of the field coils.

8 Claims, 9 Drawing Sheets

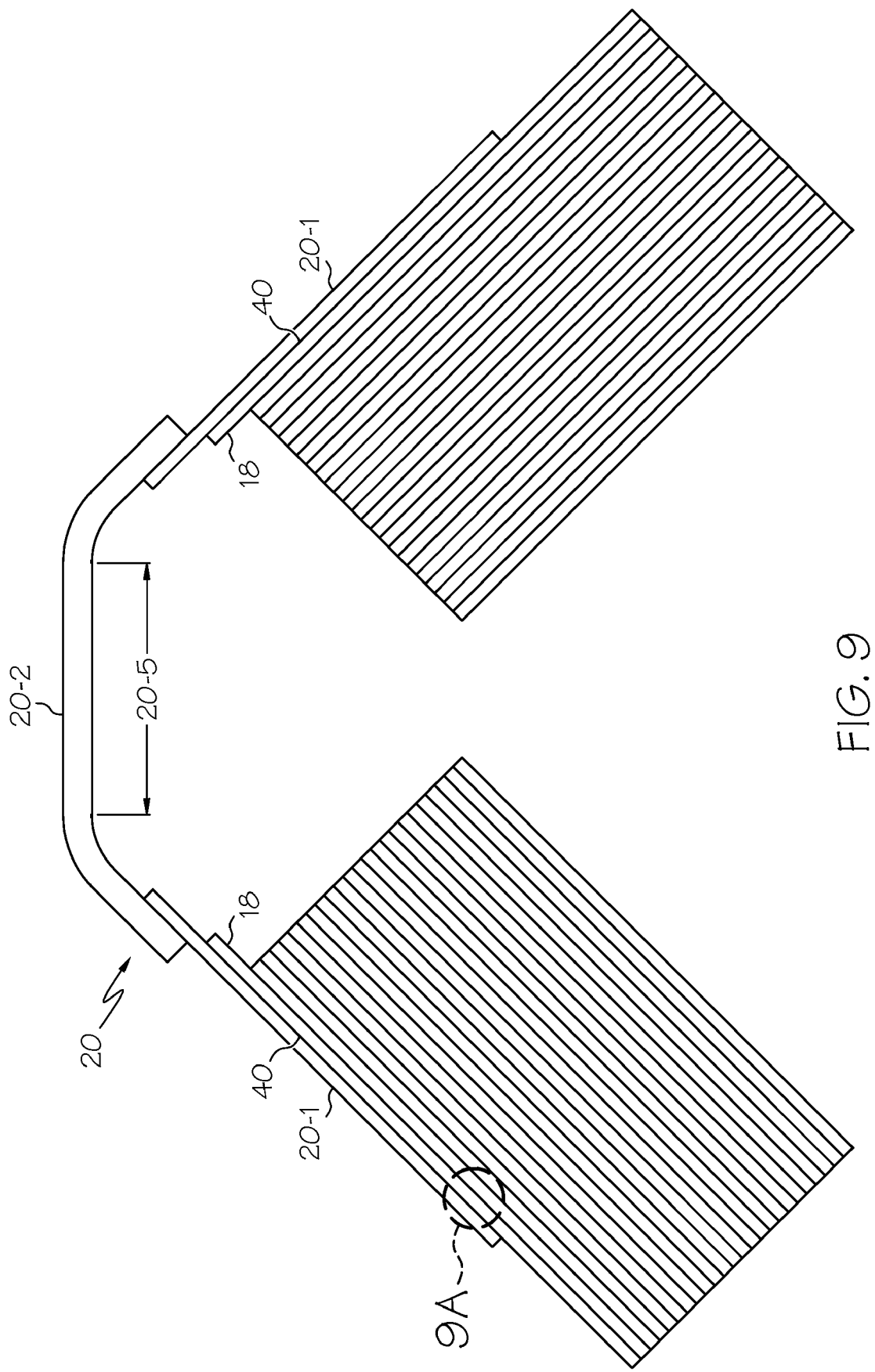

WOUND FIELD ELECTRICAL MACHINE FLAT BRAIDED WIRE MAIN ROTOR CROSSOVER ASSEMBLY

BACKGROUND OF THE INVENTION

The present invention is in the field of electrical generators and motors and, more particularly, electrical starter generators operating at very high rotational speeds.

In certain applications of generators such as those employed in aircraft, there is a requirement to produce a high power density with a generator that is small in size and light in weight. In these applications, a desired high power density may be achieved with relatively small generators which operate at very high rotational speeds. A typical aircraft generator may operate at rotational speeds of 12,000 to 24,000 rpm.

When a generator is operated at such high rotational speeds, rotatable components of the generator may be subjected to correspondingly high centrifugal forces. Some rotatable components may be particularly vulnerable to damage from centrifugal forces and fatigue. Examples of these vulnerable components are interconnections between field coils of the generators.

In a typical aircraft high-speed generator, field coils may be interconnected to one another with crossovers. Fatigue inducing stresses may arise in crossovers because high rotational speeds and temperatures of the aircraft generators produce a radial displacement of the field coils relative to an axis of rotation. This radial displacement may cause variation of circumferential spacing between the field coils. While such spacing variation may be relatively small, it is nevertheless large enough to produce bending of the crossover during each change of rotational speed of the generator. Repeated bending of the flat strip crossovers may produce stresses which may lead to fatigue failure of the crossovers.

As can be seen, it would be desirable to construct high-speed generators which do not incorporate crossovers that are vulnerable to fatigue failure. Additionally, it would be desirable to provide a method for constructing such generators without producing work hardening of the crossover or wicking of brazing filler metal into the crossover.

SUMMARY OF THE INVENTION

In one aspect of the present invention a generator comprises at least a first and at least a second field coil adapted to rotate around an axis. The first and second field coils each comprise wound flat conductors. The first and second field coils are interconnected electrically in series by a crossover attached to the flat conductors of both of the field coils. The crossover comprises a flexible interconnecting member. The flexible interconnecting member has at least a first and at least a second attachment member attached thereto. The flat conductor of the first field coil is attached to the first attachment member and the flat conductor of the second field coil is attached to the second attachment member.

In another aspect of the present invention a crossover for electrically interconnecting field coils in a generator comprises a flat braided wire member having two ends and flat metal strips attached to the ends of the braided wire member.

In still another aspect of the present invention a method for producing electrical current with a high-speed electrical generator comprises the steps of, passing electrical current through at least a first and at least a second field coil, passing electrical current between the first and the second field coil on an electrically conductive crossover, rotating the field coils about an axis while producing centrifugal force on the field coils which results in a variation of circumferential spacing between the field coils and allowing the crossover to flex during the variation in circumferential displacement so that fatigue inducing stress is not produced in the crossover.

These and other features, aspects and advantages of the present invention will become better understood with reference to the following drawings, description and claims.

BRIEF DESCRIPTION OF THE DRAWINGS

FIG. 9 is a schematic view of a crossover attachment to field coils in accordance with the invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention may be useful in improving high-speed electrical generators. More particularly, embodiments of the present invention may provide a simple expedient to reduce damage from radial displacement of field coils resulting from centrifugal forces. Embodiments of the present invention may be particularly useful in aircraft generators which operate at high rotational speeds of up to about 24,000 rpm.

An embodiment of the present invention may provide a generator that is constructed with crossovers that may be produced as sub-assemblies and then inserted into the generator. The embodiment of the present invention may use a sub-assembly that incorporates a flexible braided wire member as a crossover. The embodiment of the present invention may comprise a unique construction technique which may preclude wicking of brazing filler metal into the braided wire member thus keeping the crossover flexible so that a resultant crossover may be provided with a reduced susceptibility to fatigue failure. These desirable improvements of a high-speed generator may be achieved by constructing a generator in an inventive configuration illustrated in FIG. 1.

Figure 1:
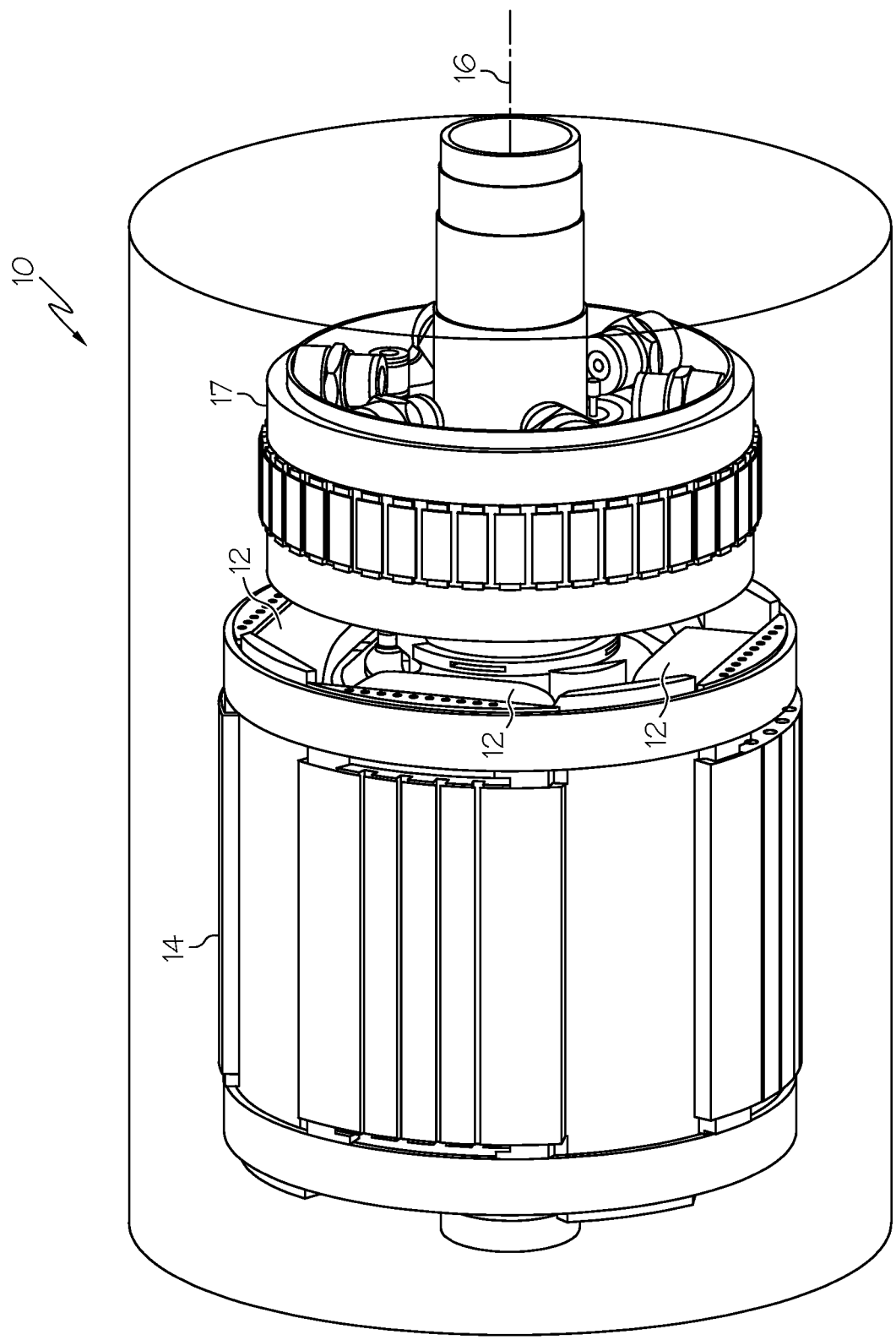
FIG. 1 is partial cross-sectional perspective view of a generator constructed in accordance with the invention.
Figure 2:
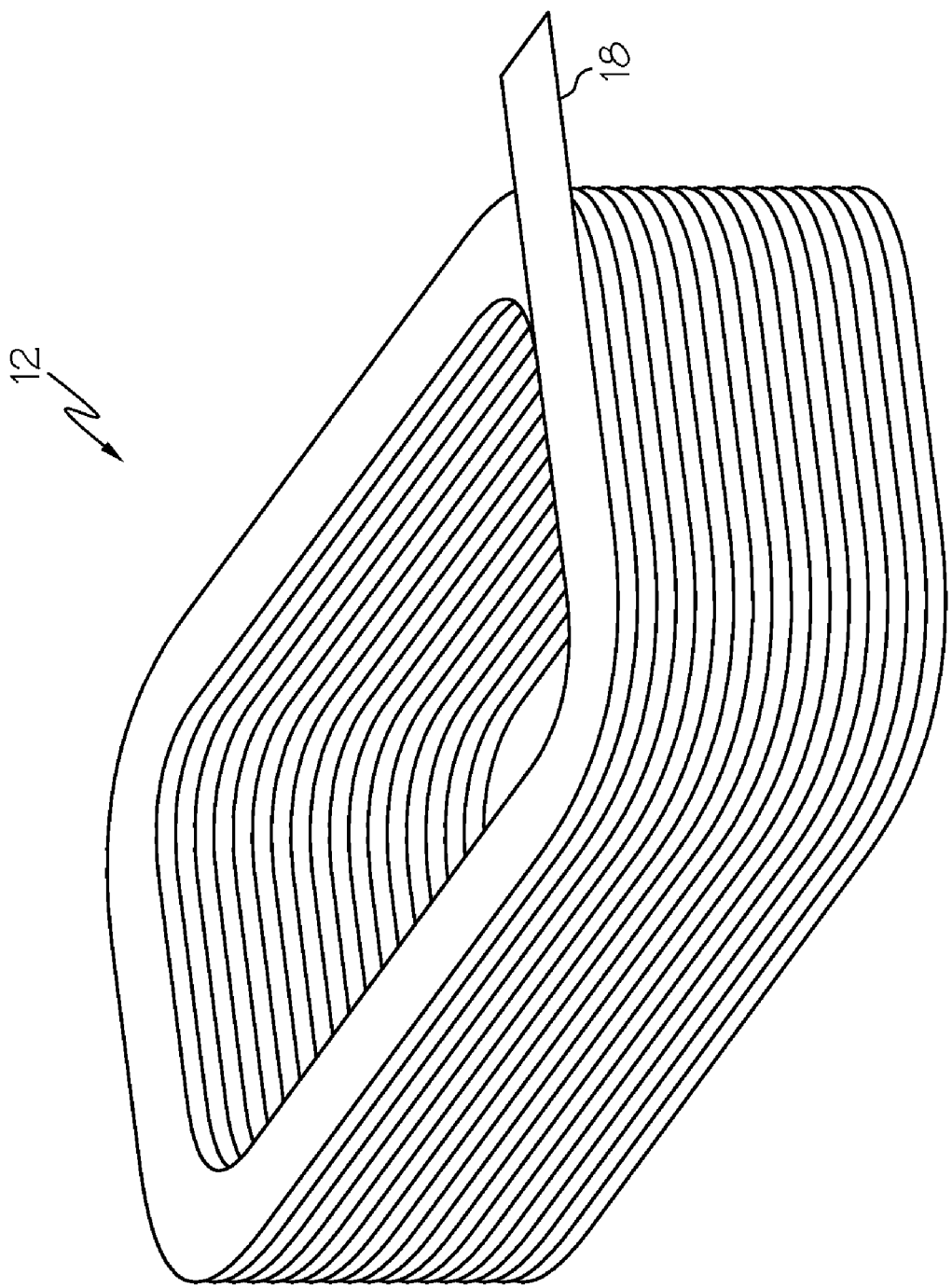
FIG. 2 is a perspective view of a field coil of the generator of FIG. 1 in accordance with the invention.
Figure 3:
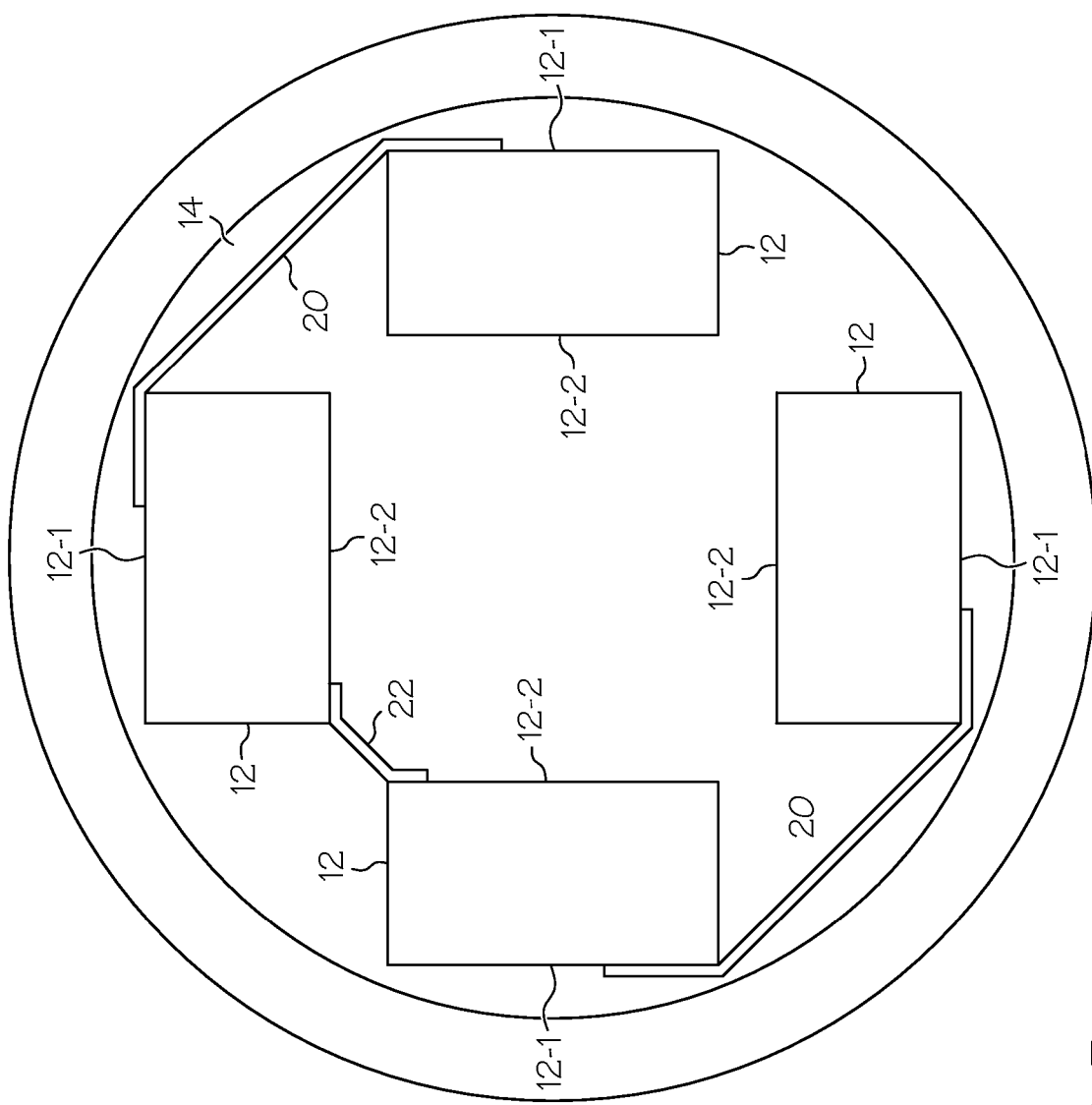
FIG. 3 is a schematic view of interconnections between field coils of the generator of FIG. 1 in accordance with the invention.

Referring now to FIGS. 1 and 2, a generator, shown symbolically and designated generally by the numeral 10, may be comprised of field coils 12 which may be assembled in a rotor 14 adapted for rotation about an axis 16. The generator 10 may also comprise an exciter assembly 17. The generator may be constructed with a plurality of field coils electrically interconnected in series. The field coils 12 may be comprised of a tightly wound conductor 18 which may have a generally flat configuration such as that illustrated in FIG. 2.

Figure 4:
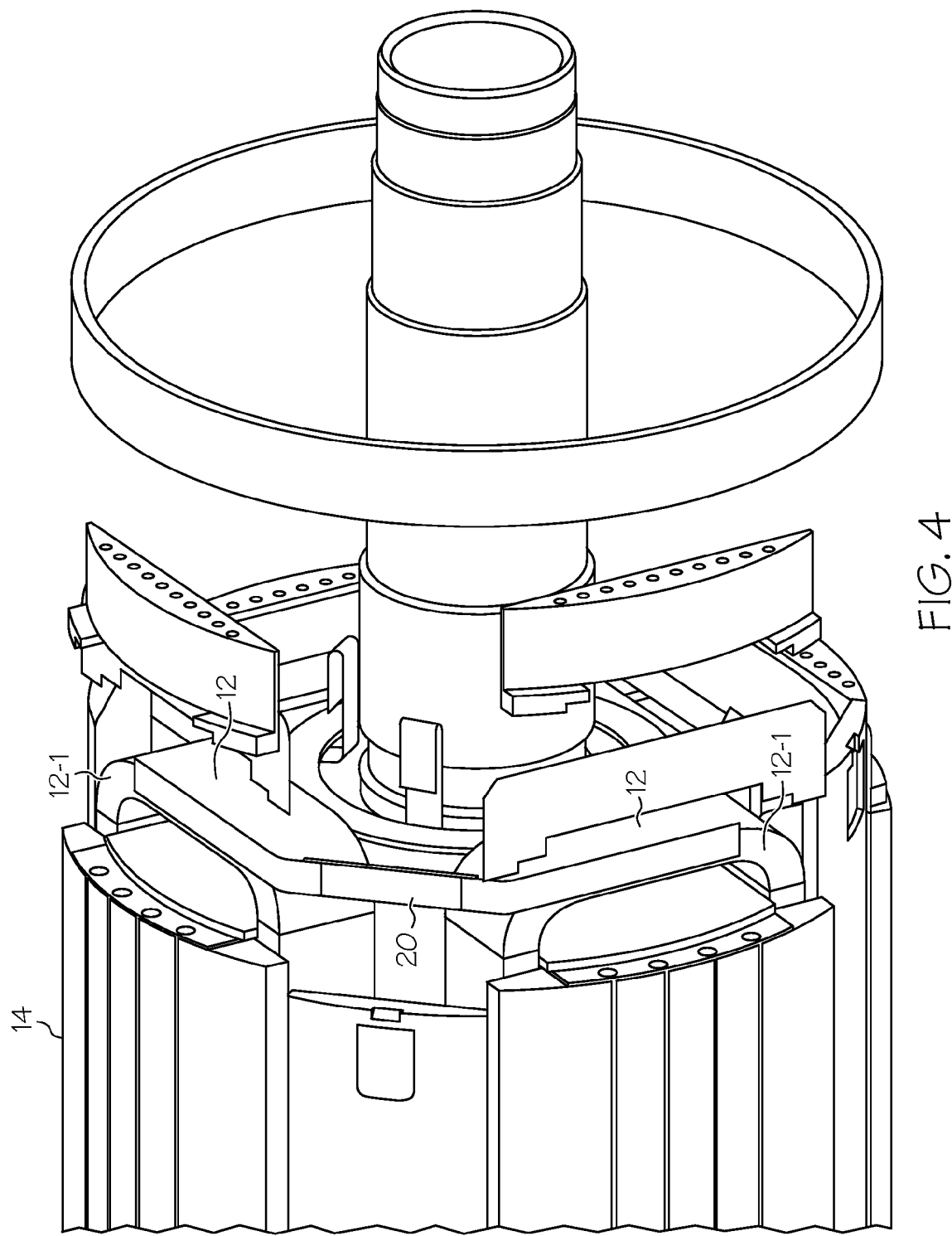
FIG. 4 is a perspective view of a portion of the generator of FIG. 1 showing a crossover in accordance with the invention.
Figure 5:
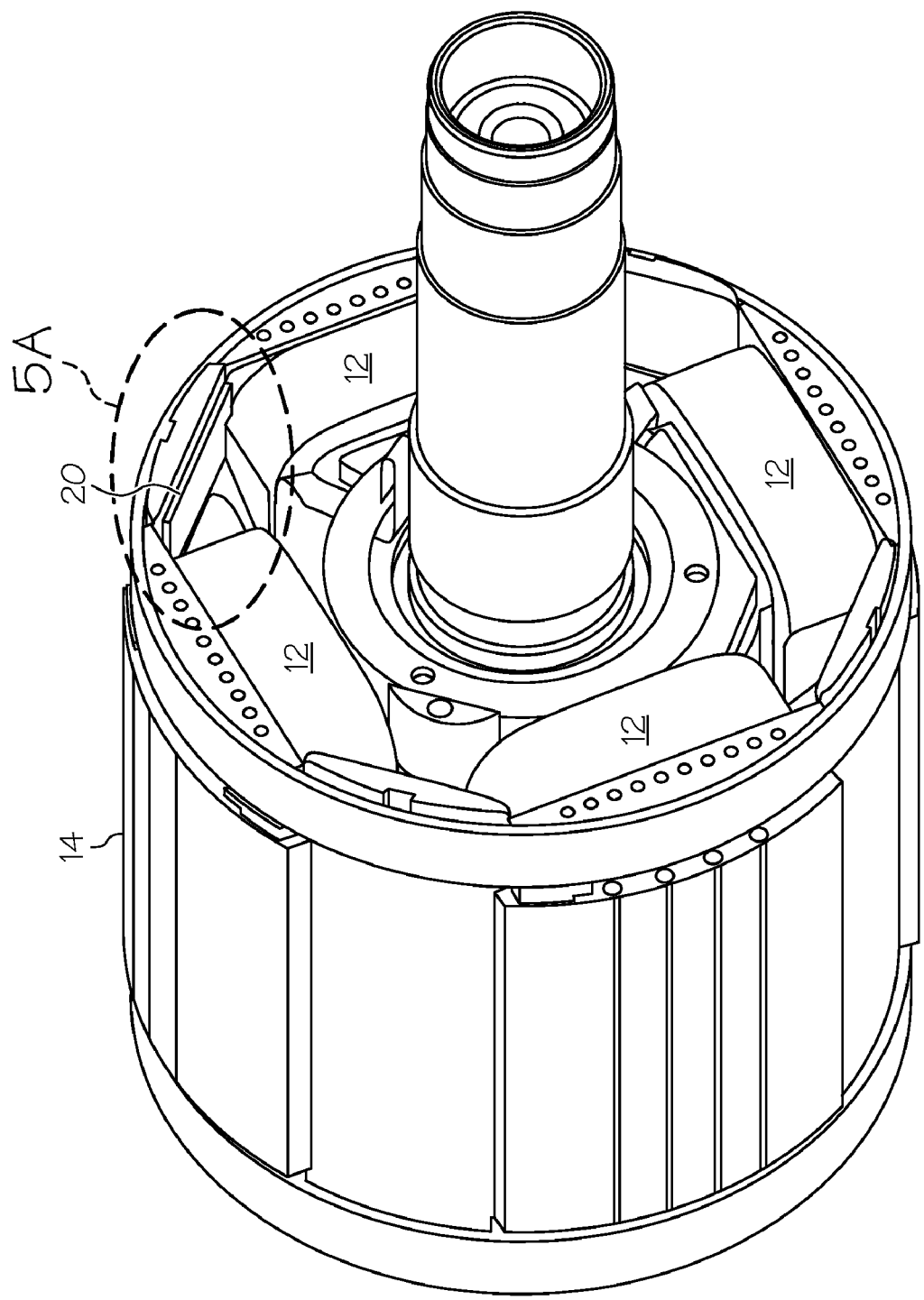
FIG. 5 is a partial perspective view of the generator of FIG. 1 showing interconnected field coils in accordance with the invention.
Figure 5A:
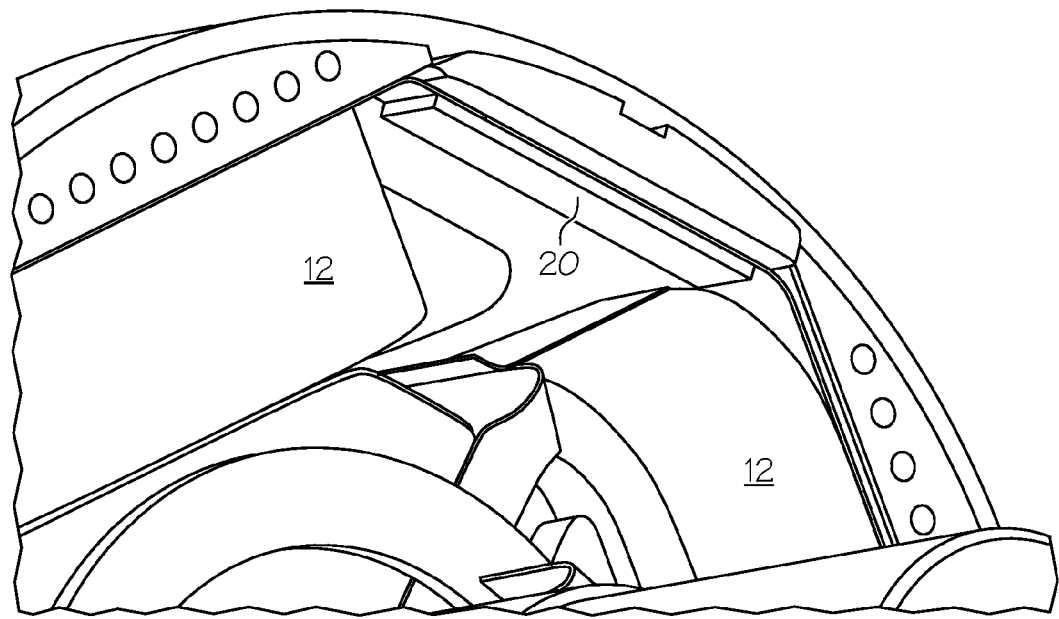
FIG. 5A is a detailed view of the portion of the generator of FIG. 5 in accordance with the present invention.
Figure 6:
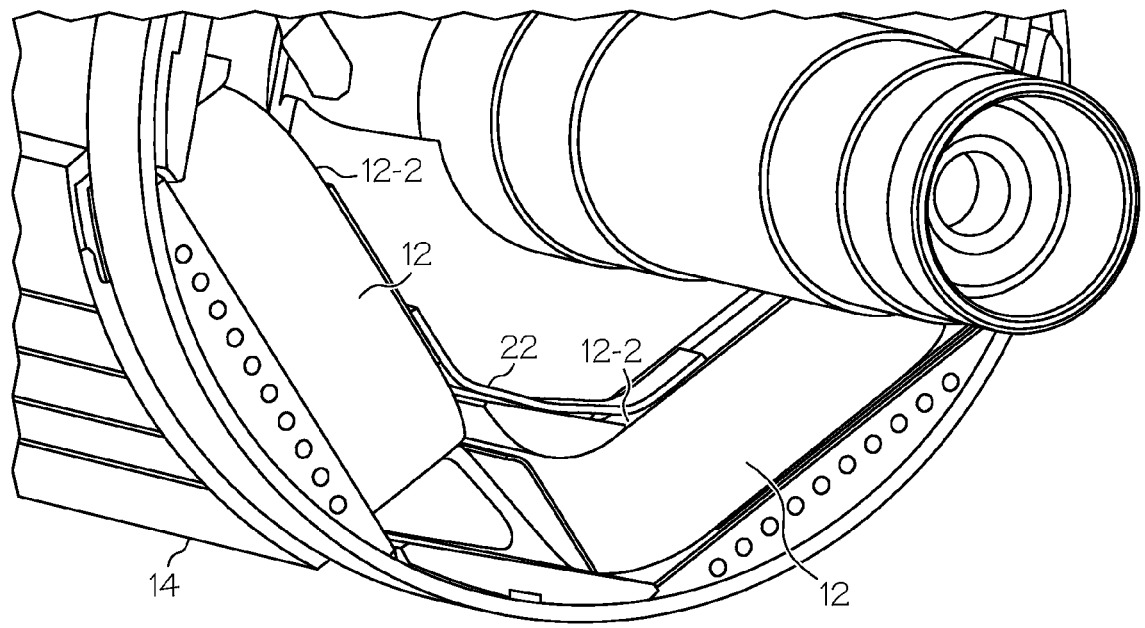
FIG. 6 is a detailed view of a portion of the generator of FIG. 1 showing an inner crossover in accordance with the present invention.

Referring now to FIGS. 3 through FIG. 6, an illustrative embodiment of the present inventive generator 10 may comprise four of the field coils 12 interconnected with one another. Interconnection between the field coils 12 may be provided with outer crossovers 20 and inner crossovers 22. The outer crossovers 20 may be attached to outer sides 12-1 of the field coils 12. The inner crossovers 22 may be attached to inner sides 12-2 of the field coils 12. FIGS. 4, 5 and 5A illustrate locations of the outer crossovers 20. FIG. 6 illustrates a location of one of the inner crossovers 22.

Figure 7:
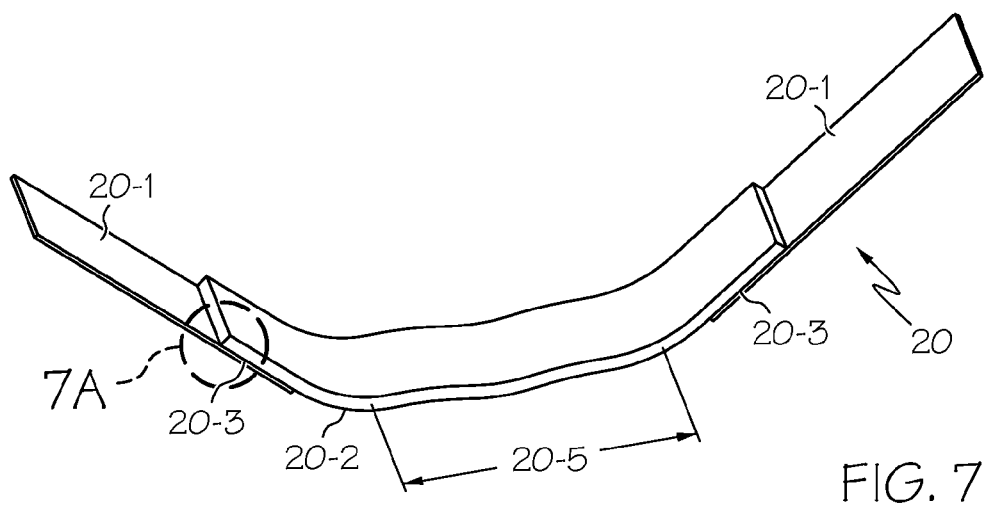
FIG. 7 is a perspective view of a crossover in accordance with the invention.
Figure 7A:
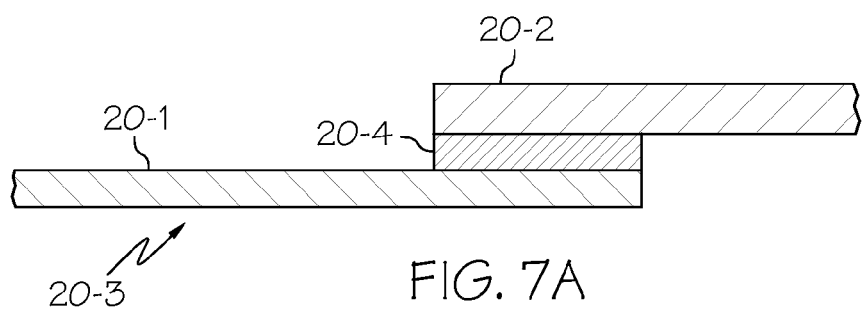
FIG. 7A is a detailed view of a portion of the crossover of FIG. 7 in accordance with the invention.

Referring now to FIGS. 7 and 7A, one of the outer crossovers 20 is shown in detail. While FIG. 7 shows construction of one of the outer crossovers 20, it should be noted that the inner crossovers 22 may be constructed in a similar manner. The outer crossover 20 may comprise a sub-assembly of attachment leads 20-1 and an interconnection member 20-2. The attachment leads 20-1 may be constructed from flat metal strip such as annealed copper. The interconnection member 20-2 may comprise braided wire. The attachment leads 20-1 may be connected to the interconnection member 20-2 with a brazed connection 20-3 that employs a brazing filler metal 20-4. A flexible portion 20-5 of the crossover 20 may be located between the brazed connections 20-3. The brazed connection 20-3 may be referred to as crossover-subassembly brazed connection because it may be produced while the crossover 20 is being constructed as a subassembly which may be subsequently assembled into the generator 10.

Figure 8:
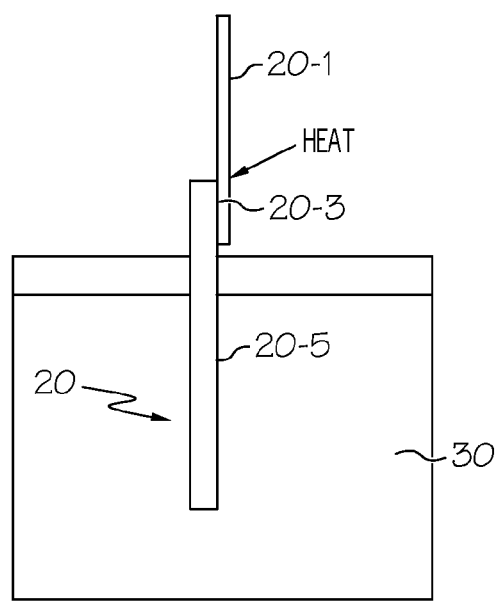
FIG. 8 is an illustration of a technique for brazing the crossover of FIG. 7 in accordance with the invention.

Referring now to FIG. 8 it may be seen that the crossover-subassembly brazed connection 20-3 may be produced without allowing any wicking of brazing filler metal 20-4 into the flexible portion 20-5 of the outer crossover 20. This desirable prevention of wicking may be achieved by immersing the flexible portion 20-5 in a cooling fluid 30 while heat may be applied to the attachment lead 20-1 during brazing. The cooling fluid 30 may keep the flexible portion 20-5 at a temperature below a melting temperature of the brazing filler metal 20-4. Thus, the brazing filler metal 20-4 may not wick into the flexible portion 20-5 of the crossover 20. Consequently, a resultant one of the crossovers 20 may be produced with desirable flexibility.

Figure 9A:
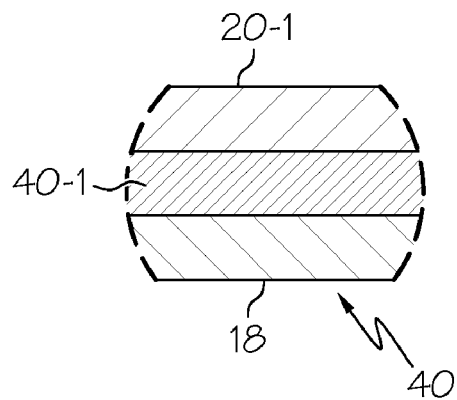
FIG. 9A is a detailed view of a portion of the crossover attachment of FIG. 9 in accordance with the invention.
Figure 10:
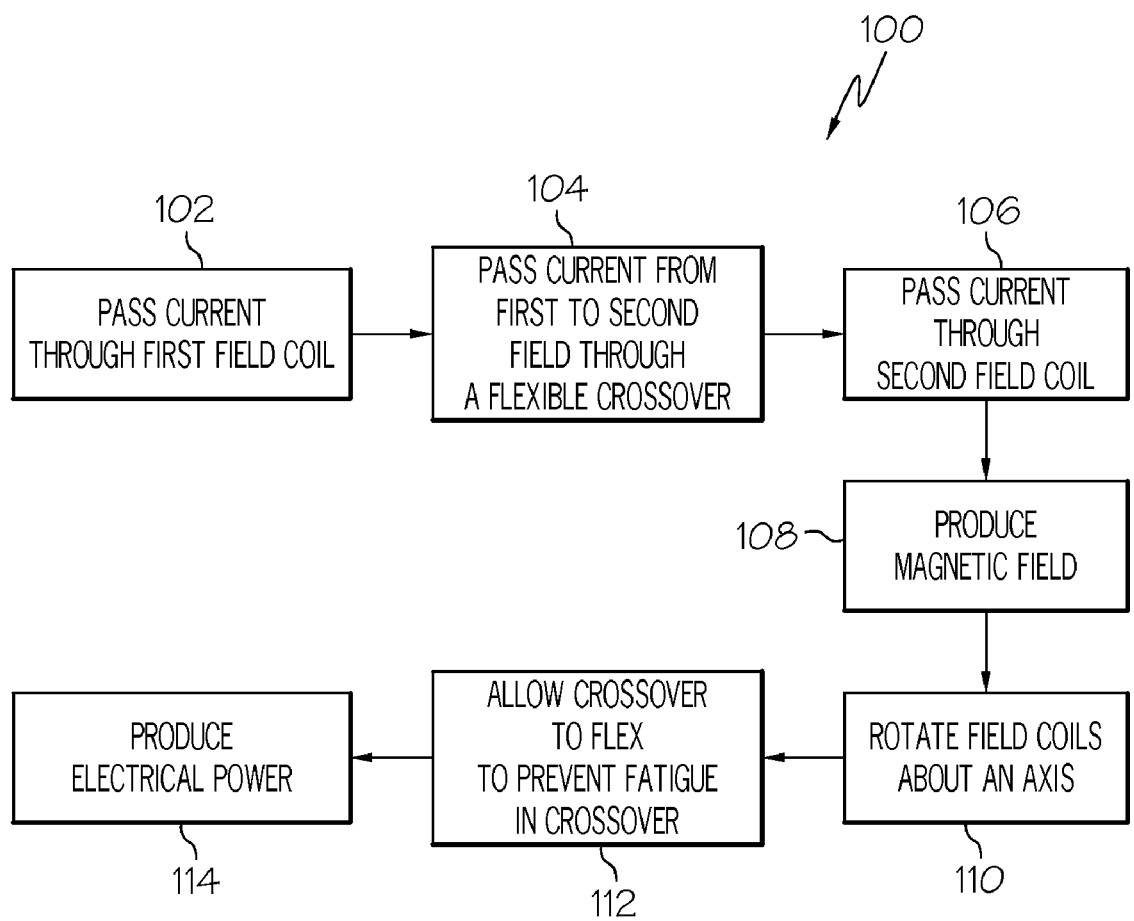
FIG. 10 is a flow chart of a method of generating electric power in accordance with the present invention.

Referring now to FIGS. 9 and 9A, it may be seen that the generator 10 of FIG. 1 may be produced by brazing the crossovers 20 to the field coils 12. In FIGS. 9 and 9A, a simplified example of construction of the generator of FIG. 1 is illustrated. Only one of the crossovers 20 is shown interconnecting only two of the field coils 12. It may be seen that crossover-attaching brazed connections 40 may be produced with crossover-attaching brazing filler metal 40-1. It may also be seen that application of heat to melt the filler metal 40-1 may not result in melting of the filler metal 20-4 of FIG. 7. Thus the coils 12 may be interconnected without a resultant wicking of either the filler metal 40-1 or the filler metal 20-4 into the flexible portion 20-5 of the crossover 20. In other words, brazing metal wicking may not produce undesirable rigidity in the flexible portion 20-5 of the crossover 20. Consequently, the coils 12 may be interconnected with a flexible interconnection that may be resistant to fatigue inducing stress. In other words fatigue inducing stress that might otherwise result from multiple changes of rotational speed of the rotor 14 (see FIG. 1) may be avoided.

In one embodiment of the present invention, a method is provided for producing electrical current with a high speed generator (e.g. the generator 10). In that regard the method may be understood by referring to FIG. 11. In FIG. 11, a flow chart portrays various aspects of an inventive method 100. In a step 102, current may be passed through a first field coil (e.g., one of the field coils 12). In a step 104, current may be passed from a first field coil to a second field coil through a flexible crossover (e.g., current may pass through the crossover 20 from one of the field coils 12 to another one of the field coils 12). In a step 106, current may be passed through a second field coil (e.g., one of the field coils 12). In a step 108, a magnetic field may be produced (e.g. by passage of current through the field coils 12). In a step 110, the field coils may be rotated about an axis (e.g., the field coils 12 may be rotated about the axis 16 by rotation of the rotor 14). In a step 112, the crossover may be allowed to flex to compensate for relative displacement of the field coils as a result of centrifugal force produced by rotation in the step 110 (e.g., the flexible portion 20-5 of the crossover 20 may flex). In a resultant step 114 electrical power may be produced. Thus when the steps of the method 100 are practiced, the generator may operate with multiple variations of rotational speed without producing fatigue inducing stress in the crossover.

It should be understood, of course, that the foregoing relates to exemplary embodiments of the invention and that modifications may be made without departing from the spirit and scope of the invention as set forth in the following claims.

We claim:

1. A generator comprising:
    at least a first, a second, a third and a fourth field coil adapted to rotate around an axis;
    the first, second, third and fourth field coils each comprising wound flat conductors;
    the first, second, third and fourth field coils being interconnected electrically in series by a plurality of crossovers attached to the flat conductors of the field coils;
    each crossover comprising a flexible interconnecting member;
    the flexible interconnecting member having at least a first and second attachment leads attached thereto;
    the flat conductor of one field coil being attached to the first attachment lead; and
    the flat conductor of a different field coil being attached to the second attachment lead;
    wherein the first, second, third and fourth field coils have inner sides oriented toward the axis of the generator;
    wherein the first, second, third and fourth field coils have outer sides opposite the inner sides and the outer sides are oriented away from the axis of the generator;
    wherein the first, second, third and fourth field coils are positioned sequentially and circumferentially around the axis;
    wherein a first one of the crossovers is attached to the first and second field coils at the outer sides of the first and second field coils;

wherein a second one of the crossovers is attached to the second and third field coil at the inner sides of the second and third field coils; and wherein a third one of the crossovers is attached to the third and fourth field coils at the outer sides of the third and fourth field coils.

2. The generator of claim 1 wherein the crossovers are attached to the flat conductors of the field coils with crossover-attaching brazed connections.

3. The generator of claim 2:

wherein the crossover-attaching brazed connections include braze filler metal; and wherein the flexible interconnecting member of the crossover does not contain any of the braze filler metal of the crossover-attaching brazed connections.

4. A generator comprising:

at least a first and a second field coil adapted to rotate around an axis;

the first and second field coils each comprising wound flat conductors;

the first and second field coils being interconnected electrically in series by at least one crossover attached to the flat conductors of both of the field coils;

each crossover comprising a flexible interconnecting member;

the flexible interconnecting member having at least a first and at least a second attachment lead attached thereto;

the flat conductor of the first field coil being attached to the first attachment lead; and the flat conductor of the second field coil being attached to the second attachment lead;

wherein the flexible interconnecting member comprises flat braided wire;

wherein the flexible interconnecting members of the crossovers are attached to the attachment leads of the crossovers with crossover-subassembly brazed connections that include a filler metal; and wherein the interconnecting members comprise a flexible portion of the braided wire that is free of the filler metal of the crossover-subassembly brazed connection.

5. A generator comprising:

at least a first and a second field coil adapted to rotate around an axis;

the first and second field coils each comprising wound flat conductors;

the first and second field coils being interconnected electrically in series by at least one crossover attached to the flat conductors of both of the field coils;

each crossover comprising a flexible interconnecting member;

the flexible interconnecting member having at least a first and at least a second attachment lead attached thereto;

the flat conductor of the first field coil being attached to the first attachment lead; and the flat conductor of the second field coil being attached to the second attachment lead;

wherein a crossover subassembly comprises the attachment leads and the flexible interconnecting member; and wherein the attachment leads of the crossover subassembly are brazed to the interconnecting member while a flexible portion of the interconnecting member is not brazed.

6. The generator of claim 1 wherein an outside diameter of the generator is less than about six inches.

7. The generator of claim 1 wherein electrical power is produced by the generator at rotational speed of about 24,000 revolutions per minute (RPM) or higher.

8. The generator of claim 7 wherein multiple changes in rotational speed of a rotor of the generator does not produce fatigue stress on the crossovers.

* * * * *